(12) United States Patent
Uchida

(10) Patent No.: US 11,897,066 B2
(45) Date of Patent: Feb. 13, 2024

(54) SIMULATION APPARATUS

(71) Applicant: FANUC CORPORATION, Yamanashi (JP)

(72) Inventor: Satoshi Uchida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1311 days.

(21) Appl. No.: 16/409,873

(22) Filed: May 13, 2019

(65) Prior Publication Data

US 2019/0351520 A1 Nov. 21, 2019

(30) Foreign Application Priority Data

May 17, 2018 (JP) .................................. 2018-095591

(51) Int. Cl.
| | |
|---|---|
| *G06N 3/08* | (2023.01) |
| *G06N 3/092* | (2023.01) |
| *B23Q 15/013* | (2006.01) |
| *G05B 19/418* | (2006.01) |
| *G05B 13/02* | (2006.01) |

(52) U.S. Cl.
CPC ....... *B23Q 15/013* (2013.01); *G05B 13/0265* (2013.01); *G05B 19/41885* (2013.01); *G06N 3/08* (2013.01); *G06N 3/092* (2023.01); *G05B 2219/33301* (2013.01); *G05B 2219/39298* (2013.01)

(58) Field of Classification Search
CPC ............ G05B 19/4083; G05B 19/4086; G05B 13/0265; G05B 19/4069; G05B 19/41885; G05B 2219/33301; G05B 2219/39298; G05B 2219/42342; G06N 3/08; G06N 3/092; B23Q 15/013
See application file for complete search history.

(56) References Cited

U.S. PATENT DOCUMENTS

| | | | |
|---|---|---|---|
| 2017/0031343 A1* | 2/2017 | Hatanaka | ............... G05B 19/19 |
| 2017/0090452 A1* | 3/2017 | Kanemaru | ............. G05B 19/19 |

FOREIGN PATENT DOCUMENTS

JP 2017-33138 A 2/2017

OTHER PUBLICATIONS

W. Wang and O. A. Jianu, "A Smart Sensing Unit for Vibration Measurement and Monitoring," in IEEE/ASME Transactions on Mechatronics, vol. 15, No. 1, pp. 70-78, Feb. 2010, doi: 10.1109/TMECH.2009.2016956. (Year: 2010).*

(Continued)

*Primary Examiner* — Kamran Afshar
*Assistant Examiner* — Randall K. Baldwin
(74) *Attorney, Agent, or Firm* — HAUPTMAN HAM, LLP

(57) ABSTRACT

A simulation apparatus includes a machine learning device for learning a change in a machining route in machining of a workpiece. The machine learning device observes data indicating the changed machining route and data indicating a machining condition of the workpiece as a state variable, and also acquires determination data for determining whether or not a cycle time obtained by simulation using the changed machining route is appropriate, and learns by associating the machining condition of the workpiece with the change in the machining route, using the state variable and the determination data.

4 Claims, 6 Drawing Sheets

(56) References Cited

OTHER PUBLICATIONS

De Filippis, L. a. C., Serio, L. M., Facchini, F., & Mummolo, G. (2017). ANN Modelling to Optimize Manufacturing Process. In InTech eBooks. https://doi.org/10.5772/intechopen.71237 (Year: 2017).*
Meyes, R., Tercan, H., Roggendorf, S., Thiele, T., Büscher, C., Obdenbusch, M., Brecher, C., Jeschke, S., & Meisen, T. (2017). Motion Planning for Industrial Robots using Reinforcement Learning. Procedia CIRP, 63, 107-112. https://doi.org/10.1016/j.procir 2017.03.095 (Year: 2017).*
Sherif, S. U., Jawahar, N., & Balamurali, M. (2014). Sequential optimization approach for nesting and cutting sequence in laser cutting. Journal of Manufacturing Systems, 33(4), 624-638. https://doi.org/10.1016/j.jmsy.2014.05.011 (Year: 2014).*
Rangwala, Sabbir S., and David A. Dornfeld. "Learning and optimization of machining operations using computing abilities of neural networks." IEEE Transactions on Systems, Man, and Cybernetics 19.2 (1989): 299-314. (Year: 1989).*
Chang, W-R., and Benito FernAndez. "Improved CNC machining using NARMA neural systems." IEEE International Conference on Neural Networks. IEEE, 1993: 1865-1870. (Year: 1993).*
Nakamura, Shingo, and Shuji Hashimoto. "Application of hybrid learning strategy for manipulator robot." The 2011 International Joint Conference on Neural Networks. IEEE, 2011: 2465-2470 (Year: 2011).*

* cited by examiner

SIMULATION APPARATUS

RELATED APPLICATIONS

The present application claims priority to Japanese Patent Application Number 2018-095591 filed May 17, 2018, the disclosure of which is hereby incorporated by reference herein in its entirety.

BACKGROUND OF THE INVENTION

1. Field of the Invention

The present invention relates to a simulation apparatus.

2. Description of the Related Art

In the related art, a machining program is generated, and it is performed to machine a workpiece by controlling a machine tool based on the machining program. In machining of a workpiece, there is an allowable error as viewed from a moving route of a target tool, and in general, it is desirable to shorten a machining route; as much as possible in order to shorten a cycle time within a range of the allowable error from a commanded route. In the related art, an operator of the machine tool has generated and adjusted a machining route.

As a technique related to the machining of a workpiece in the related art, Japanese Patent Application Laid-Open No. 2017-033138 discloses a technique of implementing the machining of the workpiece while maintaining machining accuracy in a short time by incorporating machine learning into the optimum determination of the amount of movement of each axis.

In general, the generation and adjustment of the machining route for shortening the cycle time becomes a burden on the operator of the machine tool. Also, it is difficult to generate an optimum, machining route within the range of the allowable error, and in many cases, the cycle time is much open to be shorten in the generated machining route, depending on the operator's experience and ability. In the technique disclosed in the above-mentioned Japanese Patent Application Laid-Open No. 2017-033138, setting of the allowable error is a burden on the operator of the machine tool, and it is difficult to set an optimum allowable error.

SUMMARY OF THE INVENTION

In this regard, an object of the present invention is to provide a simulation apparatus for generating an optimum machining route without causing an operator to carry out a setting that becomes a burden.

The simulation apparatus according to one embodiment of the present invention is configured to change a machining route in machining of a workpiece performed in a machine tool and includes: a simulation unit for simulating the machining of the workpiece in the machine tool; and a machine learning device for learning a change in the machining route. The machine learning device includes a state observing unit for observing after-change machining route data indicating the changed machining route and machining condition data indicating a machining condition of the workpiece, as a state variable representing a current state of an environment, a determination data acquiring unit for acquiring cycle time determination data to determine whether or not a cycle time for machining the workpiece is appropriate, among a result of simulation performed by the simulation unit based on the changed machining route, as determination data indicating propriety determination result of a change in the machining route, and a learning unit for performing learning by associating the machining condition of the workpiece with the change in the machining route, using the state variable and the determination data. And the change in the machining route includes a change in a direction and a length or change in a coordinate value of a command unit configuring the machining route.

The determination data acquiring unit may further acquire shock determination data for determining a shock occurring in the machine tool due to machining, among the result of the simulation, as determination data indicating the propriety determination result of the change in the machining route.

The learning unit may include a reward calculating unit for obtaining a reward related to the propriety determination result, and a value function updating unit for updating a function representing an action to change the machining route with respect to the machining condition of the workpiece, using the reward, wherein the reward calculating unit is configured to give a higher reward as the cycle time is shorter.

The learning unit may be configured to calculate the state variable and the determination data with a multilayered structure.

A simulation apparatus according to another embodiment of the present invention is configured to change a machining route in machining of a workpiece performed in a machine tool and includes: a simulation unit for simulating the machining of the workpiece in the machine tool; and a machine learning device for learning the change in the machining route. The machine learning device includes a state observing unit for observing after-change machining route data indicating the changed machining route and machining condition data indicating a machining condition of the workpiece, as a state variable representing a current state of an environment, a learning unit for performing learning by associating a machining condition of the workpiece with a change in the machining route, and a decision making unit for determining a state variable observed by the state observing unit and a change in the machining route on the basis of the learning result by the learning unit. And the change in the machining route includes a change in a direction and a length or a change in a coordinate value of a command unit configuring the machining route.

According to the present invention, it is possible to shorten the cycle time by learning and generating an optimum non-cutting route using CAM data. According to the present invention, it is unnecessary to set an allowable error required in learning of the related art, a burden is reduced on the operator, and since there is no need for actual machining for learning by generating the optimum non-cutting route before machining, cost and time for learning are also reduced. Furthermore, since the machining program optimized on the basis of the learned result is easily acquired, the learning result is also usable in a numerically controlled machine tool without the machine learning device.

DETAILED DESCRIPTION OF THE PREFERRED EMBODIMENTS

Figure 1:
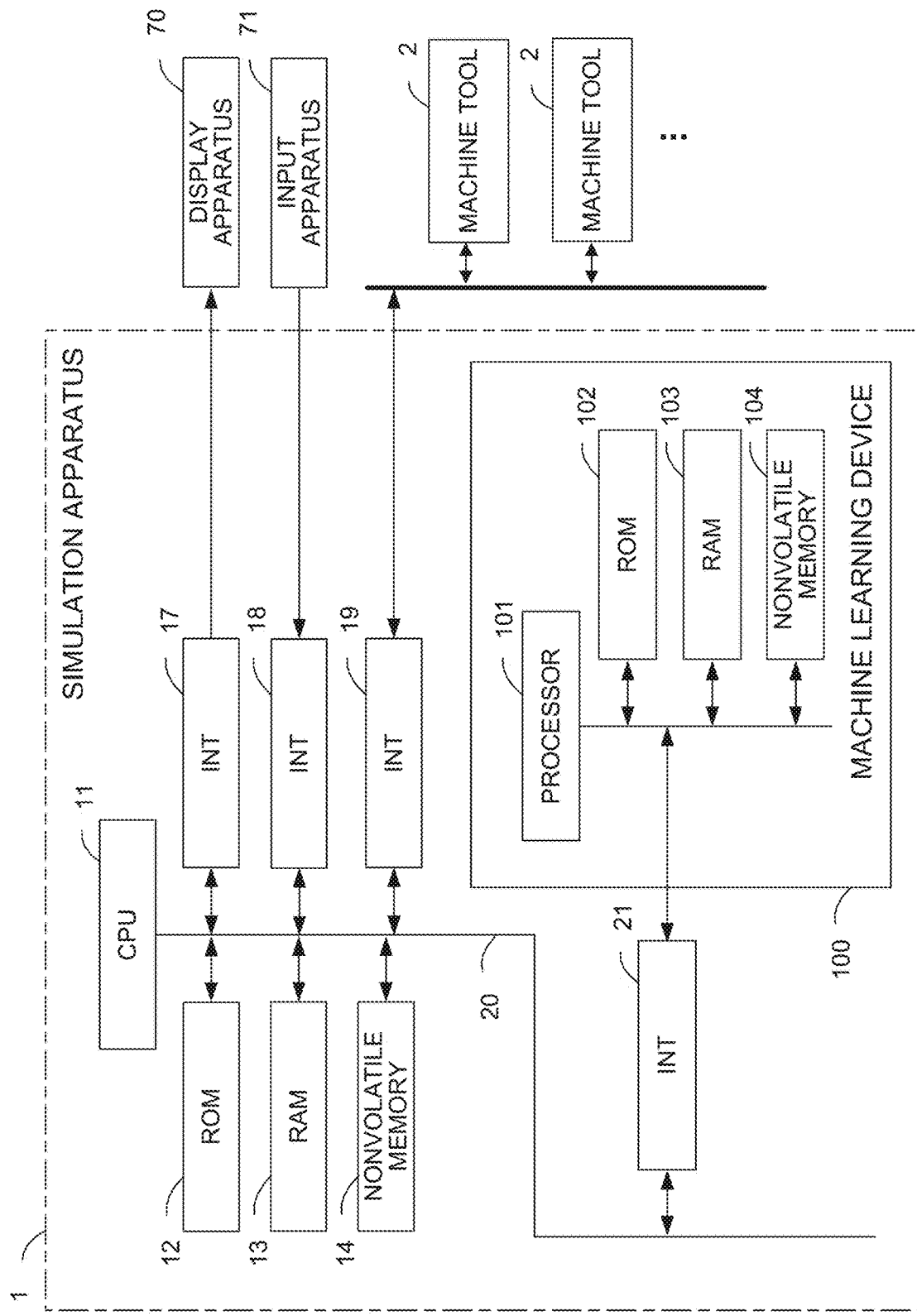
FIG. 1 is a schematic hardware configuration diagram of a simulation apparatus according to one embodiment.

FIG. 1 is a schematic hardware configuration diagram illustrating main units of a simulation apparatus according to a first embodiment.

A simulation apparatus 1 can be mounted as a computer such as a personal computer provided on the side of a controller that controls a machine tool, or a computer such as a cell computer, a host computer, an edge server, a cloud server, and the like connected to the controller through a wired/wireless network. Also, the simulation apparatus 1 can be mounted as a controller for controlling a machine tool. Also, there is illustrated an example of a case where the simulation apparatus 1 is mounted as, for example, a personal computer provided on the side of a controller for controlling a machine tool, or a computer connected to the controller for controlling a machine tool 2 through a network, in the present embodiment.

A CPU 11 provided in the simulation apparatus 1 according to the present embodiment is a processor for controlling the simulation apparatus 1 as a whole, reads a system program stored in the ROM 12 through the bus 20 and controls the entire simulation apparatus 1 according to the system program. Temporary calculation data and display data, and various data input by an operator through an input unit (not illustrated), and the like are temporarily stored in a RAM 13.

A nonvolatile memory 14 is configured as a memory in which a storage state is maintained even when the simulation apparatus 1 is powered off, for example, by being backed up by a battery (not illustrated). A program input from an input apparatus 71, a program read from an external storage device (not illustrated), and various data (for example, CAM data such as a type of a tool, a machining route of a workpiece, a machining speed, a machining shape, a jig shape and the like) acquired from the machine tool 2, a CAD/CAM or the like through a network are stored in the nonvolatile memory 14. The program and various data stored in the nonvolatile memory 14 may be developed in the RAM 13 on execution or in use. Various system programs (including a system program for controlling interaction with a machine learning device 100, to be described later) such as a known analysis program are written in advance in the ROM 12.

Each data read into a memory, data obtained as a result of executing the program and the like, data output from the machine learning device 100 to be described later, and the like are output and displayed through an interface 17 to a display apparatus 70. The input apparatus 71 including a keyboard, a pointing device, and the like receives a command, data, and the like based on an operation by the operator, and transfers them to the CPU 11.

An interface 18 is an interface for connecting the input apparatus 71 and the machine learning device 100. An interface 19 is an interface for connecting the machine tool 2 and the machine learning device 100.

An interface 21 is an interface for connecting the simulation apparatus 1 and the machine learning device 100. The machine learning device 100 includes a processor 101 that controls the entire machine learning device 100, a ROM 102 that stores a system program and the like, a RAM 103 that performs temporary storage in each processing related to machine learning, and a nonvolatile memory 104 used for storing a learning model and the like. The machine learning device 100 can observe each piece of information (for example, CAM data such as a type of a tool, a machining route of a workpiece, a machining speed, a machining shape, a jig shape, and the like) that is acquirable by the simulation apparatus 1 through the interface 21. Also, the simulation apparatus 1 receives a command to change a machining route output from the machine learning device 100 and executes simulation processing based on the changed machining route.

Figure 2:
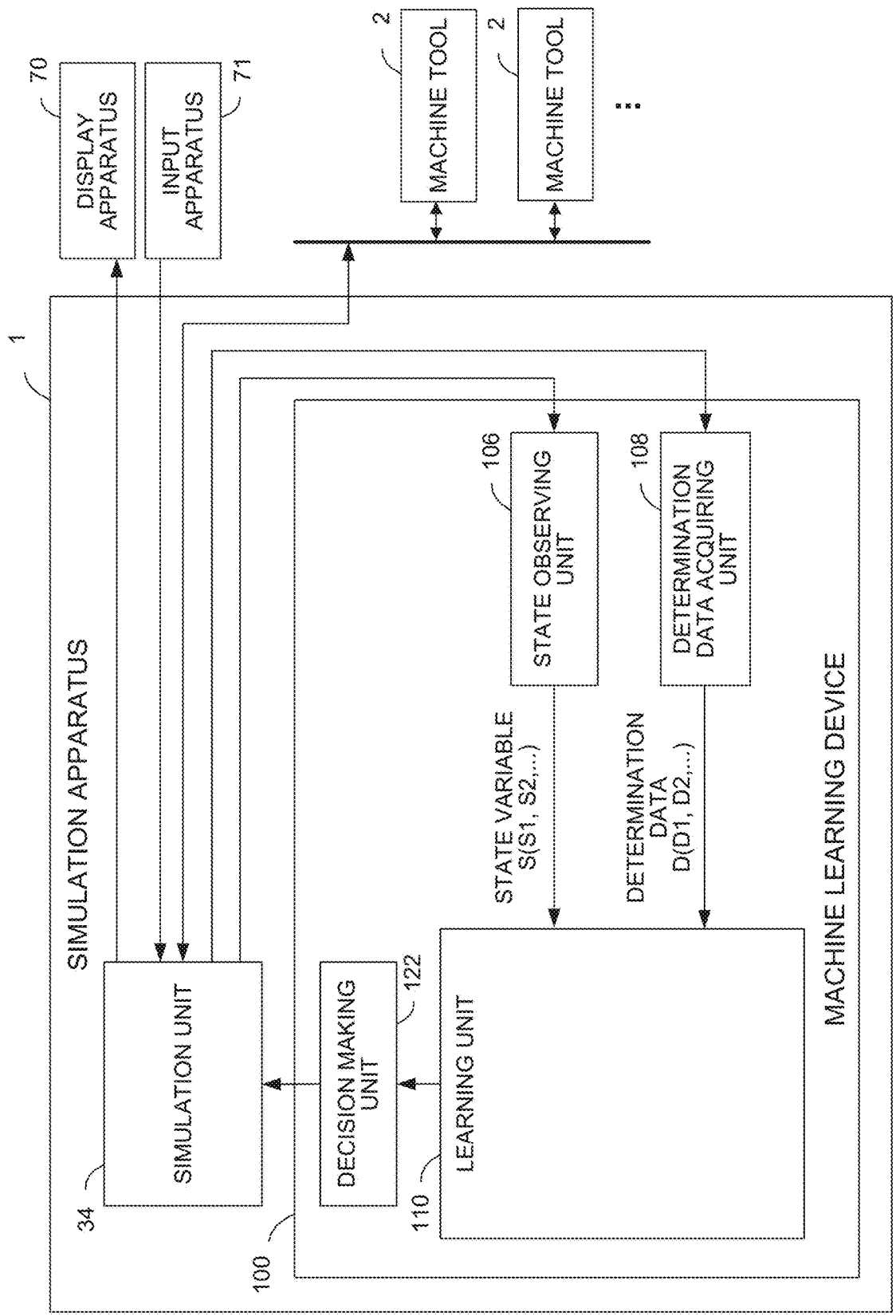
FIG. 2 is a schematic functional block diagram of a simulation apparatus according to one embodiment.

FIG. 2 is a schematic functional block diagram of the simulation apparatus 1 and the machine learning device 100 according to one embodiment.

The CPU 11, which is provided in the simulation apparatus 1 illustrated in FIG. 1, and the processor 101 of the machine learning device 100 execute each system program to control the operation of each unit of the simulation apparatus 1 and the machine learning device 100, thereby implementing each of functional blocks illustrated in FIG. 2.

The simulation apparatus 1 of the present embodiment includes a simulation unit 34 for simulating the machining of a workpiece by the machine tool 2, based on the CAM data acquired from the machine tool 2 or CAD/CAM (not illustrated), and a command to change the machining route output from the machine learning device 100. The simulation unit 34 simulates a machining operation by the machine tool 2 using data on a type of a tool, a machining route of a workpiece, a machining speed, a machining shape, a jig shape, and the like included in the CAM data, and as a result, and outputs data as a result of general simulation processing such as a load applied to the tool at the time of machining or a cycle time in machining. As the simulation processing performed by the simulation unit 34, a known simulation technique may be appropriately adopted.

Also, in a case where the machine learning device 100 outputs a command to change the machining route, the simulation unit 34 changes data of the machining route included in the CAM data, according to the command to change the machining route output from the machine learning device 100, and executes a simulation using data of the changed machining route. After the simulation of the machining of the workpiece by the machine tool 2 using the data of the machining route changed according to the output of the machine learning device 100, the simulation unit 34 displays, at the time of the learning operation of the machine learning device 100, a result of the simulation of the workpiece on the display apparatus 70 and further puts the result of the simulation into a state that is observable from the machine learning device 100.

Thereafter, once the operator is satisfied with the result of the simulation by viewing the display apparatus, the CAM data including the data of the changed machining command is transmitted to the machine tool 2 through, for example, a network, and actually used for machining by the machine tool 2. On the other hand, in a case where the operator is not satisfied with the result of the simulation, in the machine learning device 100, the result of the simulation is evaluated, machine learning is performed based on the evaluation, and a command to newly change a machining route based on the result of the machine learning is output.

On the other hand, the machine learning device 100 provided in the simulation apparatus 1 includes software (a learning algorithm or the like) and hardware (the processor 101 and or the like) for learning a change in the machining route by the machine learning device 100, by so-called machine learning, with respect to a machining condition of the workpiece. What is learned by the machine learning device 100 provided in the simulation apparatus 1, corresponds to a model structure representing a correlation between a machining condition of the workpiece and a change in the machining route.

As indicated in the functional block in FIG. 2, the machine learning device 100, which is provided in the simulation apparatus 1, includes a state observing unit 106 for observing after-change machining route data S1 indicating the machining route changed at previous time and machining condition data S2 indicating the machining condition of the workpiece, as a state variable S representing a current state of an environment; a determination data acquiring unit 108 for acquiring determination data D including cycle time determination data D1 for determining the cycle time for machining in a simulation performed based on the changed machining route; and a learning unit 110 for performing learning by associating a machining condition of the workpiece with a change in the machining route using the state variable S and the determination data D.

As after-change machining route data S1, among the state variables S observed by the state observing unit 106, the machining route that has been changed on the basis of the command to change the machining route, output from the machine learning device 100, can be used. The machining route itself can be represented as a set of command units (a movement commanded by one code such as G00, G01, and the like in G codes) of tools configuring the machining route.

Figure 3:
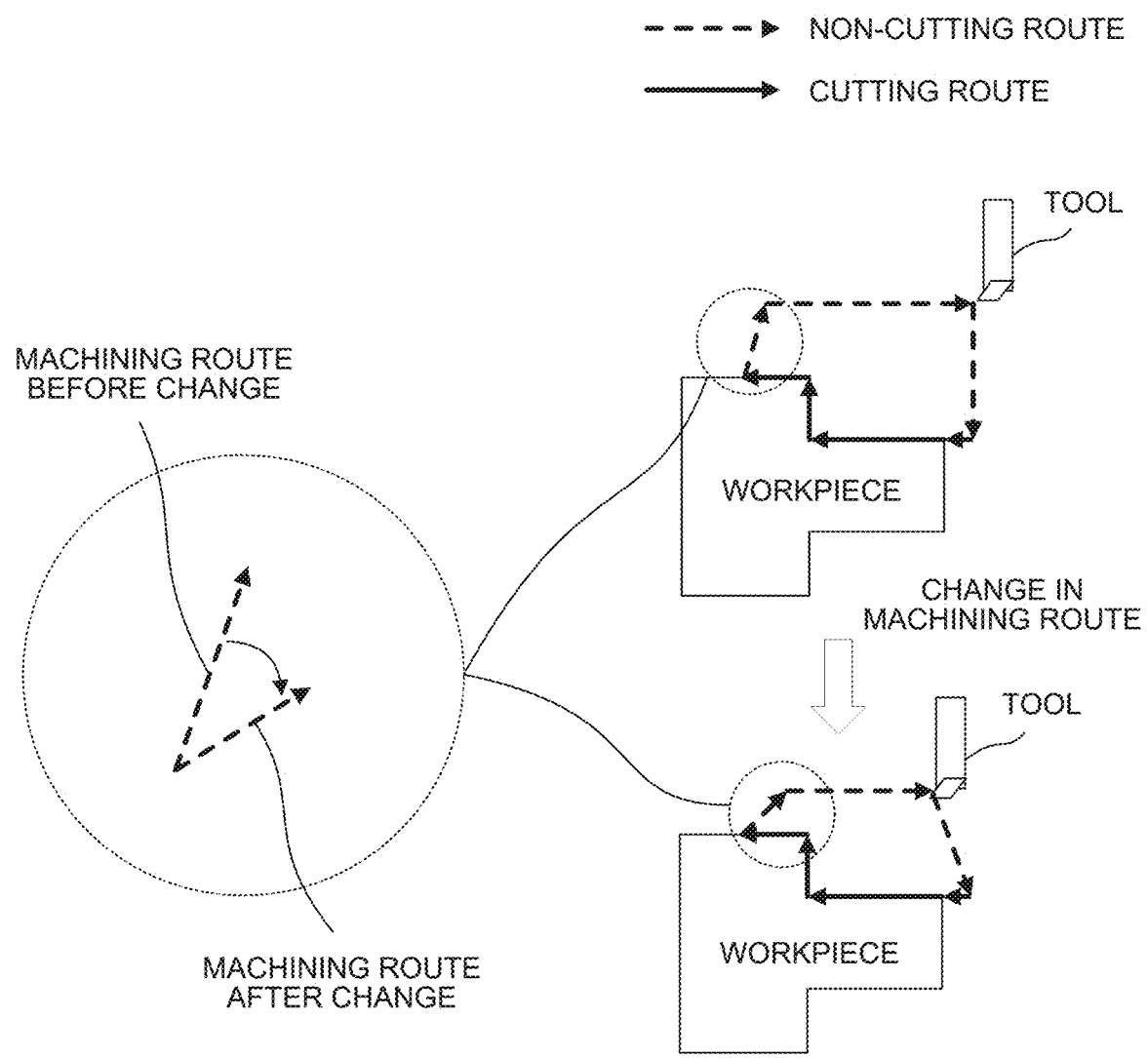
FIG. 3 is a diagram for describing a change in a machining route according to the present invention.

FIG. 3 is a diagram for describing a machining route and a change in the machining route, according to the present invention.

As illustrated in FIG. 3, the machining route is configured with a plurality of command units of a tool 3, and it is possible to divide each command unit of the tool 3 into a non-cutting route and a cutting route. The change in the machining route according to the present invention can be indicated as processing of changing a direction and a length, or a coordinate value for some of the plurality of command units of the tool configuring the machining route. In general, since each command unit configuring the machining route can be expressed in a form of a vector, for some of the vectors, a direction and a length or a coordinate value thereof only need to be changed.

The change in the machining route according to the present invention is basically performed on a non-cutting route among a plurality of command units of the tool configuring the machining route, and when a change in the route is performed for a plurality of consecutive non-cutting routes, a position of the final non-cutting route after movement is adjusted to coincide with a position before the change. Also, the change in the machining route according to the present invention is performed within a range where the machining shape and the tool do not come into contact with each other, in consideration of the machining shape of the workpiece included in the CAM data. Since a change in a direction and length or a coordinate value of each command unit can be indicated by variables of a direction and length or variables of a coordinate value of the vector indicating the command unit, the change in the machining route can be expressed as a set of variables of the direction and length or variable quantities of the coordinate value of each command unit configuring the machining route.

Also, the change in the machining route according to the present invention may include change from a straight route in a command unit into a circular arc route (a movement commanded by a code such as G02, G03, and the like in G codes).

As the after-change machining route data S1, the machining route that has been changed in an immediately preceding learning cycle, output by the machine learning device 100 for the machining route in the learning cycle based on the learning result of the learning unit 110, can be used. When adopting such a technique, the machine learning device 100 temporarily stores the machining route that has been changed at the previous time in the RAM 103 for each learning cycle, and the state observing unit 106 may temporarily acquire, from the RAM 103, the machining route that has been changed in the immediately preceding learning cycle, as the after-change machining route data S1 in the learning cycle at this time.

As machining condition data S2, among the state variables S observed by the state observing unit 106, the type of the tool, the machining speed, the machining shape, the jig shape, and the like included in the CAM data can be used.

The determination data acquiring unit 108 can acquire, as cycle time determination data D1, the determination result for the cycle time obtained by the simulation processing of the workpiece machining by the machine tool 2 performed by the simulation unit 34 based on the changed machining route. For example, the cycle time determination data D1 acquired by the determination data acquiring unit 108 may be data on determination as to whether the cycle time obtained by the simulation processing of the workpiece machining by the machine tool 2 in a state where the machining route has been changed is small (appropriate) or large (inappropriate), as compared with the cycle time obtained in a state where the machining route has not been changed.

Incidentally, although the determination data acquiring unit 108 is essential in the stage of learning by the learning unit 110, the determination data acquiring unit 108 is not necessarily an essential configuration after the learning, in which the machining condition of the workpiece is associated with the change in the machining route, is completed by the learning unit 110.

In view of the learning cycle by the learning unit 110, the state variable S input to the learning unit 110 at the same time as the determination data D is based on data in the learning cycle immediately before the learning cycle in which the determination data D has been acquired. In this way, while the machine learning device 100 provided in the simulation apparatus 1 makes progress in learning, in the environment, acquisition of the machining condition data S2, execution of the machining simulation by the simulation unit 34 based on machining route data S1 that has been changed on the basis of each acquired data, and acquisition of the determination data D are repeatedly performed.

The learning unit 110 learns a change in the machining route with respect to a machining condition of the workpiece, according to an optional learning algorithm collectively represented as machine learning. The learning unit 110 can iteratively execute learning based on the data set including the state variable S and the determination data D described above. During the repetition of a cycle for learning the change in the machining route with respect to the machining condition of the workpiece, the state variable S is based on the machining condition of the workpiece in the immediately preceding learning cycle and the machining route that has been changed in the immediately preceding learning cycle as described above, and the determination data D is based on a propriety determination result of the simulation processing performed based on the changed machining route.

By repetition of such a learning cycle, the learning unit 110 can automatically identify features implying a correlation between a machining condition of the workpiece and a change in the machining route. At the start of the learning algorithm, the correlation between the machining condition of the workpiece and the change in the machining route is substantially unknown, but the learning unit 110 gradually identifies the features and interprets the correlation as the learning advances. Once the correlation between the machining condition of the workpiece and the change in the machining route is interpreted to a reliable level to some extent, the learning results that are iteratively output by the learning unit 110 may be used for performing a selection (that is, making a decision) of an action as to how to change the machining route with respect to the current state (that is, the machining condition of the workpiece). That is, with the advancement of the learning algorithm, the learning unit 110 can gradually approximate, to the optimum solution, a correlation representing an action as to how to change the machining route with respect to the machining condition of the workpiece.

A decision making unit 122 determines a change in the machining route based on the state variable S and the result learned by the learning unit 110, and outputs, to the simulation unit 34, a command to change the machining route for performing the determined change in the machining route.

As described above, in the machine learning device 100 provided in the simulation apparatus 1, by using the state variable S observed by the state observing unit 106 and the determination data D acquired by the determination data acquiring unit 108, the learning unit 110 learns the change in the machining route with respect to the machining condition of the workpiece, according to a machine learning algorithm. The state variable S is configured with data such as after-change machining route data S1 and machining condition data S2, and the determination data D is uniquely obtained from information acquired as a result of the simulation processing. Therefore, according to the machine learning device 100 provided in the simulation apparatus 1, by using the learning result of the learning unit 110, it is possible to automatically and accurately perform a change in an optimum machining route according to the machining condition of the workpiece.

Then, in a case where it is possible to automatically perform the change in the optimum machining route, it is possible to rapidly change a machining route into an appropriate state by merely recognizing data related to machining of CAM data and the like.

As a modified example of the machine learning device 100 provided in the simulation apparatus 1, the determination data acquiring unit 108 may acquire shock determination data D2 for determining a shock occurring in the machine tool 2 due to the machining of the workpiece performed based on the changed machining route, in addition to the cycle time determination data D1, as the determination data D. For example, the shock determination data D2 acquired by the determination data acquiring unit 108 may be a result determined based on an appropriately set criterion of whether the acceleration of the tool (in a case where the acceleration is large, the shock occurs in the machine) obtained in the simulation processing performed based on the changed machining route is smaller (appropriate) or larger (inappropriate) than a predetermined threshold value. By acquiring the shock determination data D2 as the determination data D, it is possible to perform a change in the machining route for shortening the machining time of the workpiece within a range in which a large shock does not occur in the machine tool 2.

Figure 4:
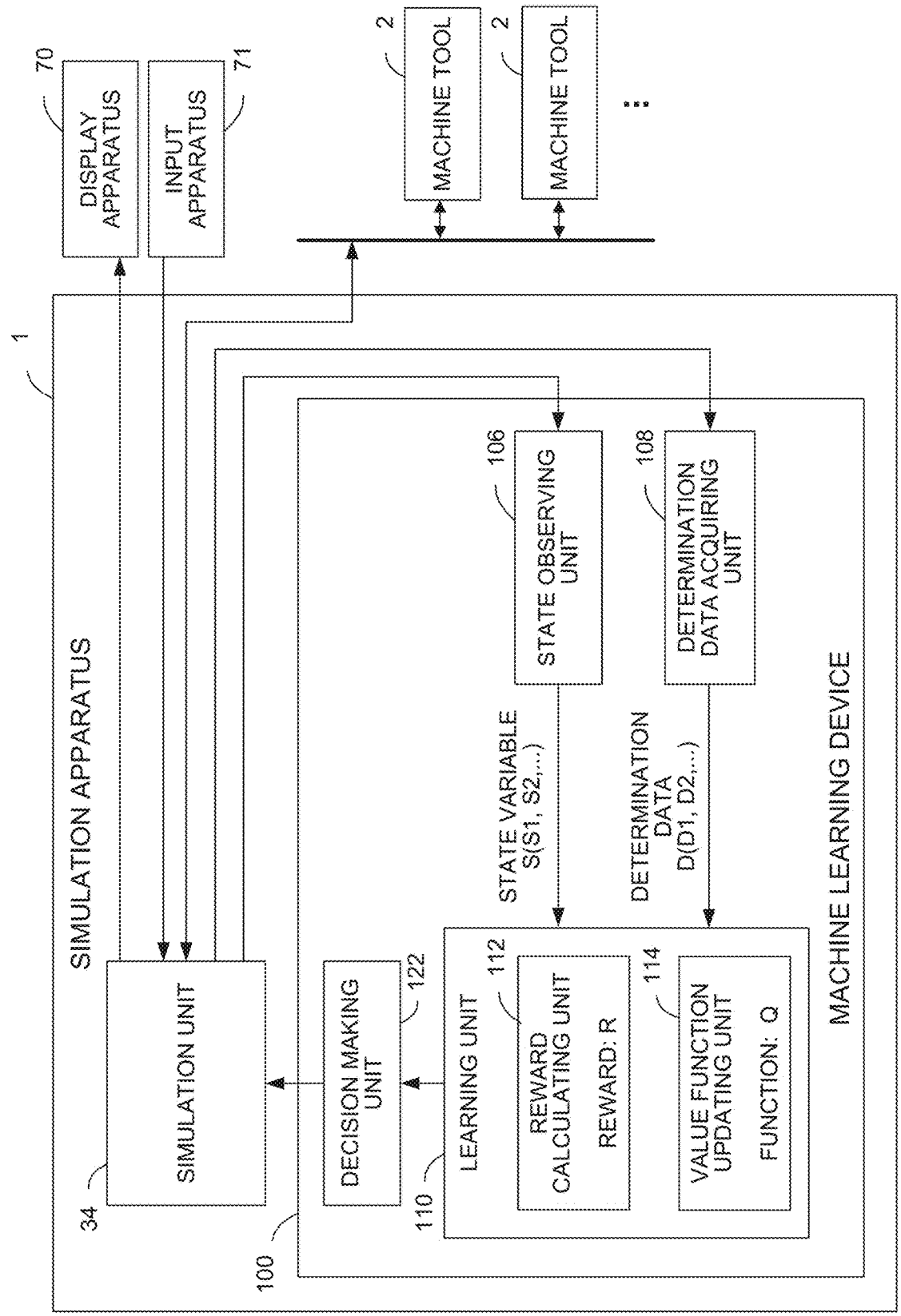
FIG. 4 is a schematic functional block diagram illustrating one embodiment of the simulation apparatus.

In the machine learning device 100 having such a configuration, the learning algorithm executed by the learning unit 110 is not particularly limited, but a known learning algorithm may be adopted as machine learning. FIG. 4 is one embodiment of the simulation apparatus 1 illustrated in FIG. 2, and illustrates a configuration such that a learning unit 110 for executing reinforcement learning is provided as an example of the learning algorithm. The reinforcement learning is a technique of learning, as an optimal solution, a strategy for maximizing the total amount of rewards (changes in the machining route in the machine learning device of the present invention) by repeating a cycle of observing the current state (that is, input) of the environment in which an object to be learned is provided, executing a predetermined action (that is, output) in the current state, and giving some reward to the action, through trial and error.

In the machine learning device 100 provided in the simulation apparatus 1 illustrated in FIG. 4, the learning unit 110 includes a reward calculating unit 112 and a value function updating unit 114. The reward calculating unit 112 obtains a reward R related, to a propriety determination result (corresponding to the determination data D to be used in the next learning cycle after the learning cycle in which the state variable S is acquired) of the simulation based on the machining route that has been changed on the basis of the state variable S. The value function updating unit 114 update a function Q representing a value of the machining route changed at the previous time, using the reward R. As the value function updating unit 114 repeats updating the function Q, the learning unit 110 learns the change in the machining route with respect to the machining condition of the workpiece.

An example of a reinforcement learning algorithm executed by the learning unit 110 will be described. The algorithm according to this example is known as Q learning (Q-learning), and is a technique of learning a function $Q(s, a)$ representing a value of an action in a case where an action a is selected in a state s, using the state s of an action subject and the action a selectable by the action subject in the state s, as independent variables. An optimal solution is to select an action a where a value function Q becomes the highest in the state s. By repeating a cycle of starting Q learning in a state where a correlation between the state s and the action a is unknown, and selecting various actions a in any state s, through trial and error, the value function Q is iteratively updated and approximated to the optimal solution. Here, when the environment (that is, the state s) is changed as a result of selecting the action a in the state s, reward (that is, a weight of the action a) r corresponding to the change is configured to be obtainable, and learning is induced to select an action a in which a higher reward r is obtainable, so that it is possible to approximate the value function Q to the optimal solution in a relatively short time.

The updating equation of the value function Q can be generally represented by Equation (1) below. In Equation (1), $s_t$ and $a_t$ are a state and an action at time t, respectively, and the state is changed into $s_{t+1}$ by the action $a_t$. The $r_{t+1}$ is a reward obtained by changing the state from $s_t$ to $s_{t+1}$. The term "maxQ" expresses Q in a case where an action a, by which the maximum value Q is obtained at time t+1 (which is assumed at time t), is performed. α and γ are a learning coefficient and a discount rate, respectively, and are optionally set with $0<\alpha\le 1$ and $0<\gamma\le 1$.

$$Q(s_t,a_t) \leftarrow Q(s_t,a_t)+\alpha(r_{t+1}+\gamma\max_a Q(s_{t+1},a)-Q(s_t,a_t)) \quad (1)$$

In a case where the learning unit 110 executes the Q learning, the state variable S observed by the state observing unit 106 and the determination data D acquired by the determination data acquiring unit 108 correspond to a state s of the updating equation, and an action as to how to change the machining route with respect to a current state (that is, the machining condition of the workpiece) corresponds to the action a of the updating equation, and the reward R obtained by the reward calculating unit 112 corresponds to the reward r of the updating equation. Therefore, the value function updating unit 114 repeatedly updates the function Q representing a value of the machining route that has been changed at the previous time with respect to the current state, by Q learning using the reward R.

Regarding the reward R obtained by the reward calculating unit 112, if a propriety determination result of the simulation performed based on the changed machining route, which is performed after the machining route is changed, is determined to be "appropriate" (for example, a case where the cycle time for machining a workpiece is shortened or is equal to or less than a predetermined threshold value, a case where the shock occurring at the time of machining the workpiece is smaller than a predetermined threshold, and the like), then a positive (plus) reward R is set, whereas, if a propriety determination result of the simulation performed based on the changed machining route, which is performed after the machining route is changed, is determined to be "inappropriate" (for example, a case where the cycle time for machining a workpiece becomes longer or is equal to or more than a predetermined threshold value, a case where the shock occurring at the time of machining the workpiece is larger than a predetermined threshold, and the like), then a negative (minus) reward R is set. The absolute values of the positive and negative rewards R may be the same to each other or different from each other. Also, a combination of a plurality of values included in the determination data D may be used as a determination condition.

Also, it is possible to set a propriety determination result of machining of a workpiece based on the adjusted machining route that has been changed at the previous time to a plurality of stages as well as two stages of "appropriate" or "inappropriate". As an example, in the case where the threshold value of the cycle time for machining a workpiece obtained by simulation is $T_{max}$, the reward R=5 is given when a cycle time T associated with the machining of the workpiece is $0 \leq T < T_{max}/5$, the reward R=3 is given when a relation $T_{max}/5 \leq T < T_{max}/2$ is satisfied, the reward R=1 is given when a relation $T_{max}/2 \leq T < T_{max}$ is satisfied, and the reward R=−3 (minus reward) is given when a relation $T_{max} \leq T$ is satisfied.

Also, when using a plurality of pieces of determination data, it is possible to change a target state in learning by changing (weighting) the value of the reward for each determination data. For example, by increasing a reward to be given based on the determination result of the cycle time determination data D1, it is possible to learn the change in the machining route that emphasizes machining time, and on the other hand, by increasing a reward to be given based on the determination result of the shock determination data D2, it is possible to learn the change in the machining route that emphasizes the machining stability, the tool and a life of the machine tool 2. Furthermore, a threshold value used for the determination may be set relatively large in the initial stage of learning, and the threshold value used for the determination may be gradually reduced as the learning advances.

The value function updating unit 114 can have an action value table organized by associating the state variable S, the determination data D, and the reward R with the action value (for example, a numerical value) represented by the function Q. In this case, action of updating the function Q by the value function updating unit 114 corresponds to action of updating the action value table by the value function updating unit 114. Since a correlation between a current state of an environment and a change in the machining route is unknown at the start of Q learning, in the action value table, a variety of state variables S, determination data D and rewards R are provided in a form in association with randomly determined values of the action value (function Q). In a case where the determination data D is known, the reward calculating unit 112 can immediately calculate the corresponding reward R, and the calculated value R is written in the action value table.

When the Q learning advances with the reward R according to propriety determination result of simulation, the learning is induced to select an action in which a higher reward R is obtainable, and the action value table is updated by rewriting a value (function Q) of the action value for the action to be pier formed in the current state, according to a state of the environment which is changed as a result of executing the selected action in the current state (that is, the state variable S and the determination data D). By repeating this updating, the value (function Q) of the action value displayed in the action value table is rewritten into a larger value as the action becomes more appropriate (in the case of the present invention, an action to change the machining route in order to shorten a cycle time related to the machining of the workpiece within a range in which a large shock does not occur in the machine tool 2). In this way, a correlation between an unknown current state of the environment (the machining condition of the workpiece) and an action (change in the machining route) corresponding to the current state gradually becomes obvious. That is, by updating the action value table, the correlation between the machining condition of the workpiece and the change in the machining route gradually approaches the optimal solution.

Figure 5:
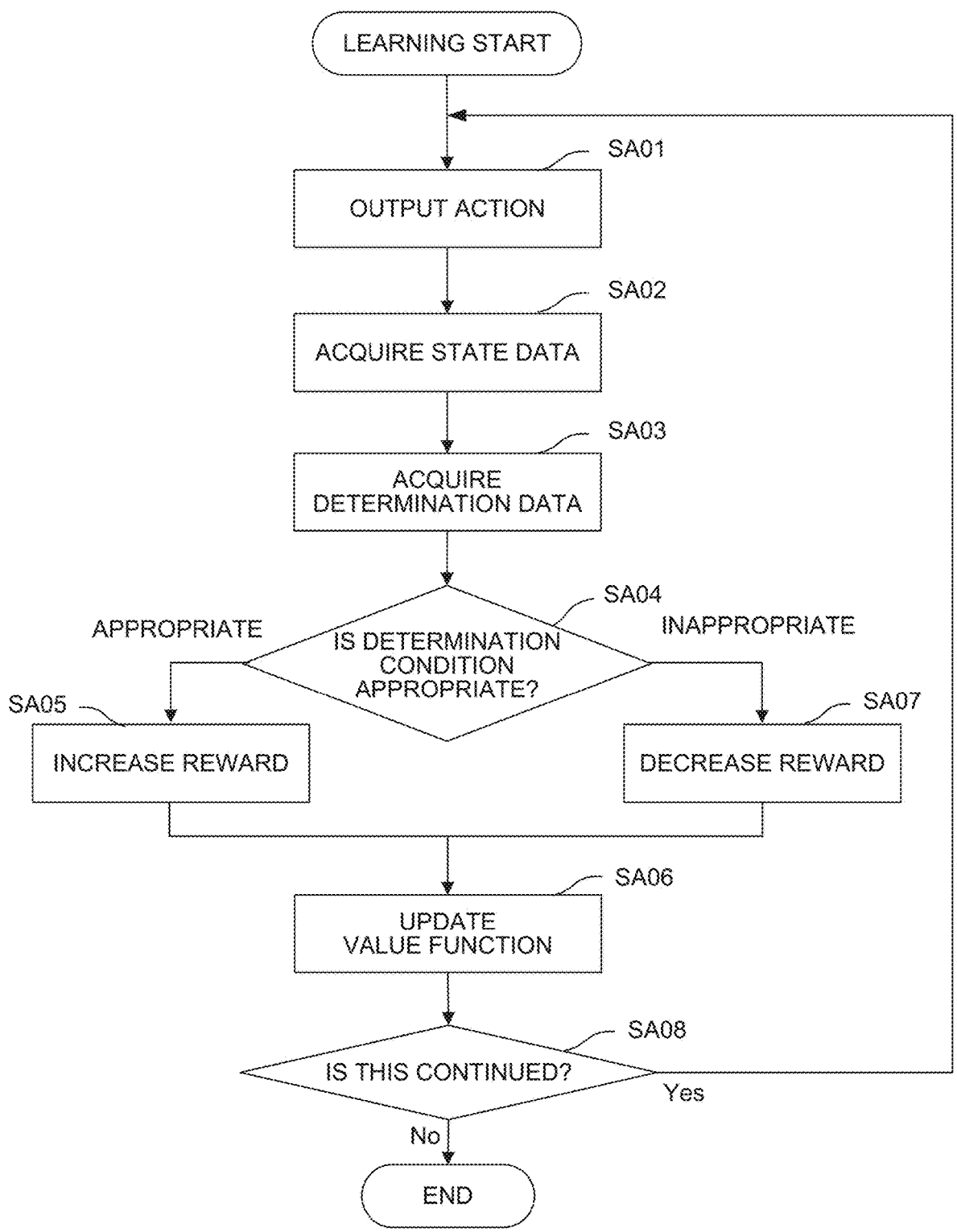
FIG. 5 is a schematic flow chart illustrating one embodiment of a machine learning method.

Referring to FIG. 5, the flow (that is, one embodiment of the machine learning method) of Q learning executed by the learning unit 110 will be further described.

First, in step SA01, referring to the action value table at that time, the value function updating unit 114 randomly selects an action to change the machining route as an action to be performed in the current state indicated by the state variable S observed by the state observing unit 106. Next, the value function updating unit 114 fetches the state variable S of the current state observed by the state observing unit 106, in step SA02, and fetches the determination data D of the current state acquired by the determination data acquiring unit 108, in step SA03. Next, the value function updating unit 114 determines whether or not a result of the simulation based on the changed machining route is appropriate based on the determination data D, in step SA04. In a case where the result is appropriate, the value function updating unit 114 applies a positive reward R obtained by the reward calculating unit 112 to the updating equation of the function Q, in the step SA05, and then updates the action value table using the state variable S and the determination data D in the current state, the reward R, and the value of the action value (updated function Q), in step SA06. On the other hand, in a case where it is determined in step SA04 that the result of the simulation based on the changed machining route is not appropriate, a negative reward R obtained by the reward calculating unit 112 is applied to the updating equation of the function Q, in step SA07, and then the action value table is updated using the state variable S and the determination data D in the current state, the reward R, and the value of the action value (updated function Q), in step SA06. The learning unit 110 iteratively updates the action value table by repeating processing in steps SA01 to SA07, and causes the learning of change in the machining route to advance. It should be noted that the processing of obtaining the reward R and the processing of updating the value function from the step SA04 to the step SA07 are performed on each data included in the determination data D. In response to the action value table being updated in step SA06, the flow of the Q learning proceeds to step SA08. In step SA08, it is determined whether the update of the value function is continued. In response to determining that the update of the value function is continued in step SA08, the flow of the Q learning returns step SA01. In response to determining that the update of the value function is not continued in step SA08 the flow of the Q learning is ended.

Figure 6A:
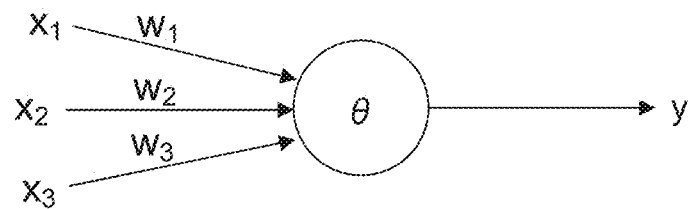
FIG. 6A is a diagram for describing a neuron.
Figure 6B:
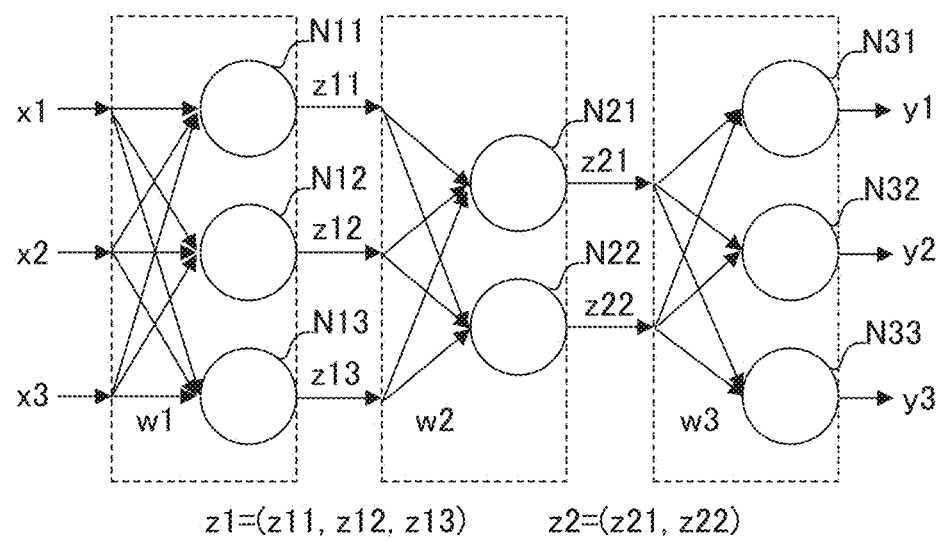
FIG. 6B is a diagram for describing a neural network.

For example, it is possible to apply a neural network when advancing reinforcement learning described above. FIG. 6A schematically illustrates a neuron model. FIG. 6B schematically illustrates a model of a three-layer neural network configured by combining neurons illustrated in FIG. 6A. For example, the neural network is configurable with an arithmetic device imitating a model of a neuron, a storage device, or the like.

The neuron as illustrated in FIG. 6A outputs a result y for a plurality of inputs x (herein, inputs $x_1$ to $x_3$, as an example). Each of the inputs $x_1$ to $x_3$ is multiplied by weights w ($w_1$ to $w_3$) respectively corresponding to this input x. As a result, the neuron outputs the result y represented by Equation (2) below. Incidentally, in Equation (2), the input x, the result y and the weight w are all vectors. Also, θ is a bias, and $f_k$ is an activation function.

$$y = f_k(\Sigma_{i=1}^{n} x_i w_i - \theta) \quad (2)$$

In the three-layered neural network illustrated in FIG. 6B, a plurality of inputs x (here, inputs x1 to x3 as an example) are input from the left side and the result y (herein, results y1 to y3, as an example) is output from the right side. In the illustrated example, each of inputs x2, x2, and x3 is multiplied by a corresponding weight (collectively represented as w1), and each of the inputs x1, x2, and x3 is input to three neurons N11, N12, and N13.

In FIG. 6B, the outputs of each of the neurons N11 to N13 are collectively represented as z1, i.e., z1=(z11, z12, z13). The z1 can be regarded as a feature vector from which feature quantities of input vectors are extracted. In the illustrated example, each of elements of the feature vector z1 is multiplied by a corresponding weight (represented collectively as w2), and each of the individual elements of the feature vector z1 is input to two neurons N21 and N22. The feature vector z1 represents a feature between the weight W1 and the weight W2.

Furthermore, the outputs of each of the neurons N21 to N22 are collectively represented as z2, i.e., z2=(z21, z22). The z2 can be regarded as a feature vector from which the feature quantities of the feature vector z1 are extracted. In the illustrated example, each of elements of the feature vectors z2 is multiplied by a corresponding weight (represented collectively as w3), and each of the individual elements of the feature vector z2 is input to three neurons N31, N32, and N33. The feature vector z2 represents a feature between the weight W2 and the weight W3. Finally, the neurons N31 to N33 output results y1 to y3, respectively.

Incidentally, it is also possible to use a so-called deep learning method using a neural network with three or more layers.

In the machine learning device 100 provided in the simulation apparatus 1, using the neural network as a value function in the Q learning and using the state variable S and the action a as the input x, the learning unit 110 can perform a calculation on a multilayered structure according to the neural network described above, so that it is also possible to output a value (result y) of a certain action corresponding to a certain state. Incidentally, an operation mode of the neural network includes a learning mode and a value prediction mode. For example, the weight w is learned using the learning data set in the learning mode, and it is possible to determine a value of an action in the value prediction mode using the learned weight w. In the value prediction mode, it is possible to perform detection, classification, inference, and the like.

The configuration of the simulation apparatus 1 described above may be described as a machine learning method (or software) executed by the processor 101. This machine learning method is a method of learning, by a CPU of a computer, a change in a machining route, including steps of:

observing after-change machining route data S1 and the machining condition data S2 as a state variable S representing a current state of an environment in which a machine tool 2 operates;

obtaining determination data D indicating a propriety determination result of simulation processing based on the changed machining route; and performing learning by associating the machining condition data S2 with the change in the machining route, using the state variable S and the determination data D.

Even though the embodiments have been described above, the embodiments are not limited only to examples of the above-described embodiments, and are able to be implemented in various modes by making appropriate changes.

For example, the learning algorithm and arithmetic algorithm executed by the machine learning device 100, the control algorithm executed by the simulation apparatus 1, and the like are not limited to those described above, and various algorithms is adoptable.

In the above embodiment, the simulation apparatus 1 and the machine learning device 100 are described as those having different CPUs, but the machine learning device 100 may be configured to be implemented by the CPU 11 provided in the simulation apparatus 1 and the system, program stored, in the ROM 12.

The invention claimed is:

1. A simulation apparatus for changing a machining route in machining of a workpiece performed in a machine tool to shorten a cycle time for machining the workpiece, the simulation apparatus comprising:

a simulation unit, implemented by a processor, for simulating the machining of the workpiece in the machine tool; and a machine learning device for learning a change in the machining route, wherein the machine learning device includes a neural network, and observes (i) after-change machining route data indicating a changed machining route changed based on a command of the machine tool and (ii) machining condition data indicating a machining condition of the workpiece, as a state variable representing a current state of an environment, acquires cycle time determination data to determine whether or not the cycle time for machining the workpiece is appropriate, with a smaller cycle time being appropriate and a larger cycle time being not appropriate, among a result of simulation performed by the simulation unit based on the changed machining route, as determination data indicating propriety determination result of a change in the machining route, performs a multilayer-structure calculation corresponding to the neural network using the state variable and the determination data, and learns a correlation between the machining condition of the workpiece and the change in the machining route, and wherein the change in the machining route includes (a) a change in a direction and a length or (b) a change in a coordinate value of a command unit implemented by the processor and configuring the machining route, and the simulation unit is configured to change the machining of the workpiece performed in the machine tool based on the change learned by the machine learning device, and output a machining command corresponding to the changed machining route to the machine tool to perform the machining of the workpiece.

2. The simulation apparatus according to claim 1, wherein the machine learning device further acquires shock determination data for determining a shock occurring in the machine tool due to machining, among the result of the simulation, as the determination data indicating the propriety determination result of the change in the machining route.

3. The simulation apparatus according to claim 1, wherein the machine learning device obtains a reward related to the propriety determination result, wherein the reward is higher as the cycle time is shorter, and updates a function representing an action to change the machining route with respect to the machining condition of the workpiece, using the reward.

4. A simulation apparatus for changing a machining route in machining of a workpiece performed in a machine tool to shorten a cycle time for machining the workpiece, the simulation apparatus comprising:

a simulation unit, implemented by a processor, for simulating the machining of the workpiece in the machine tool; and a machine learning device for determining a change in the machining route, wherein the machine learning device includes a neural network, and observes (i) after-change machining route data indicating a changed machining route changed based on a command of the machine tool and (ii) machining condition data indicating a machining condition of the workpiece, as a state variable representing a current state of an environment, performs a multilayer-structure calculation corresponding to the neural network using the state variable, learns a correlation between the machining condition of the workpiece and the change in the machining route, and determines, by using the state variable and the correlation learned by the machine learning device, the change in the machining route, and wherein the change in the machining route includes (a) a change in a direction and a length or (b) a change in a coordinate value of a command unit implemented by the processor and configuring the machining route, and the simulation unit is configured to change the machining of the workpiece performed in the machine tool based on the change learned by the machine learning device, and output a machining command corresponding to the changed machining route to the machine tool to perform the machining of the workpiece.

* * * * *